US008482762B2

(12) United States Patent
Agarwal

(10) Patent No.: US 8,482,762 B2
(45) Date of Patent: Jul. 9, 2013

(54) METHOD AND APPARATUS FOR APPROVING COLOR SAMPLES

(75) Inventor: Niraj Agarwal, Charlotte, NC (US)

(73) Assignee: Clariant Finance (BVI) Limited, Tortola (VG)

( * ) Notice: Subject to any disclaimer, the term of this patent is extended or adjusted under 35 U.S.C. 154(b) by 157 days.

(21) Appl. No.: 12/248,457

(22) Filed: Oct. 9, 2008

(65) Prior Publication Data
US 2009/0097736 A1 Apr. 16, 2009

Related U.S. Application Data

(62) Division of application No. 10/195,251, filed on Jul. 15, 2002, now abandoned.

(60) Provisional application No. 60/376,007, filed on Apr. 26, 2002.

(51) Int. Cl.
G06F 3/12 (2006.01)
H04N 1/60 (2006.01)
G03F 3/08 (2006.01)
G06Q 30/00 (2012.01)
G06K 9/00 (2006.01)

(52) U.S. Cl.
USPC ............. 358/1.15; 358/1.9; 358/518; 705/27; 382/167

(58) Field of Classification Search
USPC .. 358/1.15, 1.13, 1.16, 518, 530, 1.9; 705/27; 382/167
See application file for complete search history.

(56) References Cited

U.S. PATENT DOCUMENTS

| 4,873,570 | A | * | 10/1989 | Suzuki et al. | 358/515 |
|-----------|---|---|---------|--------------|---------|
| 4,887,906 | A |   | 12/1989 | Koehler      |         |
| 5,023,812 | A | * | 6/1991  | Pfeiffer     | 358/1.1 |
| 5,140,413 | A | * | 8/1992  | Suzuki et al.| 358/518 |
| 5,255,350 | A |   | 10/1993 | Hermann et al.|        |
| 5,493,321 | A | * | 2/1996  | Zwadlo       | 347/131 |
| 5,619,434 | A |   | 4/1997  | Keating      |         |
| 5,668,633 | A | * | 9/1997  | Cheetam et al.| 356/402|
| 5,689,425 | A |   | 11/1997 | Sainio et al.|         |
| 5,731,989 | A | * | 3/1998  | Tenny et al. | 358/1.9 |

(Continued)

FOREIGN PATENT DOCUMENTS
EP 0913674 5/1999
EP 1148322 10/2001

(Continued)

OTHER PUBLICATIONS eWarna.com Managing ColorOnline, www.ewarna.com, Jul. 22, 2002.

(Continued)

Primary Examiner — Madelein A Nguyen
(74) Attorney, Agent, or Firm — Tod A. Waldrop

(57) ABSTRACT

A color approval system that facilitates the use of electronic color submissions. The electronic color submissions contain reflectance values for a physical color sample to be submitted for approval. The system includes a data storage area accessible by a submitter of the electronic color sample and a reviewer of the color sample. The submitter upload the submission to the data storage area, from which the reviewer retrieves the submission and replies with an acceptance or rejection, typically via e-mail. The system provides tools for the analysis of the electronic color sample and automatic formation of acceptances and rejections.

7 Claims, 6 Drawing Sheets

U.S. PATENT DOCUMENTS

| | | | |
|---|---|---|---|
| 6,043,894 | A | 3/2000 | Van Aken et al. |
| 6,282,567 | B1 | 8/2001 | Finch, II et al. |
| 6,338,030 | B1 * | 1/2002 | Senn et al. .................. 702/189 |
| 6,432,556 | B1 * | 8/2002 | Brauer et al. ................. 428/579 |
| 6,499,402 | B1 * | 12/2002 | Sikes et al. ................... 101/484 |
| 6,507,824 | B1 * | 1/2003 | Yon et al. ........................ 705/26 |
| 6,575,096 | B1 | 6/2003 | Caruthers et al. |
| 6,717,699 | B1 * | 4/2004 | Janssen et al. ................. 358/2.1 |
| 6,738,168 | B1 | 5/2004 | Usui et al. |
| 6,744,531 | B1 * | 6/2004 | Mestha et al. ................. 358/1.9 |
| 6,764,155 | B2 * | 7/2004 | D'Souza et al. ............... 347/12 |
| 6,842,654 | B2 * | 1/2005 | Lawn et al. ..................... 700/90 |
| 6,888,961 | B1 | 5/2005 | Tamagawa et al. |
| 6,928,545 | B1 | 8/2005 | Litai et al. |
| 7,046,396 | B2 | 5/2006 | Chan |
| 7,069,164 | B2 | 6/2006 | Viturro et al. |
| 7,184,170 | B2 | 2/2007 | Agarwal |
| 7,738,149 | B2 * | 6/2010 | Rich et al. ..................... 358/534 |
| 7,944,561 | B2 * | 5/2011 | Nisper et al. .................. 356/445 |
| 2001/0044801 | A1 * | 11/2001 | Senn et al. ................. 707/104.1 |
| 2002/0012005 | A1 | 1/2002 | Parmer, Jr. et al. |
| 2002/0042842 | A1 * | 4/2002 | Lawn et al. ................... 709/246 |
| 2002/0047848 | A1 | 4/2002 | Odagiri et al. |
| 2002/0169513 | A1 | 11/2002 | Sherrill et al. |
| 2002/0181766 | A1 | 12/2002 | McClanahan et al. |
| 2002/0184168 | A1 * | 12/2002 | McClanahan et al. .......... 706/16 |
| 2002/0184232 | A1 | 12/2002 | Menner et al. |
| 2003/0035126 | A1 * | 2/2003 | Stone et al. ................... 358/1.9 |
| 2003/0095258 | A1 * | 5/2003 | Graf et al. ..................... 356/402 |
| 2003/0097947 | A1 | 5/2003 | Caruthers et al. |
| 2003/0123072 | A1 | 7/2003 | Spronk |
| 2003/0234945 | A1 * | 12/2003 | Sebastian et al. .............. 358/1.9 |
| 2004/0135794 | A1 * | 7/2004 | Van Aken et al. ............. 345/600 |
| 2004/0173111 | A1 | 9/2004 | Okuda |
| 2004/0212624 | A1 * | 10/2004 | Reynolds ....................... 345/531 |
| 2005/0168762 | A1 | 8/2005 | Tsuchiya et al. |
| 2006/0126117 | A1 * | 6/2006 | Stone et al. .................. 358/1.15 |
| 2006/0215195 | A1 | 9/2006 | Chan |
| 2011/0048264 | A1 * | 3/2011 | Bastidas et al. ............ 101/450.1 |

FOREIGN PATENT DOCUMENTS

| | | |
|---|---|---|
| WO | WO 00/63818 | 10/2000 |
| WO | WO 01/41012 | 6/2001 |
| WO | WO 0140970 | 6/2001 |
| WO | WO 01/86521 | 11/2001 |
| WO | WO 01/97070 | 12/2001 |

OTHER PUBLICATIONS eWarna.com Managing ColorOnline, file://P:\TAW 2002\ewarna IR Project\Project Files\www.ewarna.com\sitemap.html, Jul. 22, 2002.

eWarna.com Managing ColorOnline, file://P:\TAW 2002\ewarna IR Project\Project Files\www.ewarna.com\aboutus\index.html, Jul. 22, 2002.

eWarna.com Managing ColorOnline, file://P:\TAW 2002\ewarna IR Project\Project Files\www.ewarna.com\whatwedo\index.html, Jul. 22, 2002.

eWarna.com Managing ColorOnline, file://P:\TAW 2002\ewarna IR Project\Project Files\www.ewarna.com\contactus\index.html, Jul. 22, 2002.

eWarna.com Managing ColorOnline, file://P:\TAW 2002\ewarna IR Project\Project Files\www.ewarna.com\faqs\index.html, Jul. 22, 2002.

X-Rite, TextileMaster, Textile Color Formulation Software Package, Apr. 2000.

X-Rite, Textile-Master Formulation Software, Sample Preparation Guide, Dec. 1995.

PCT International Preliminary Examination Report for PCT/IB030301682, filed Aug. 10, 2004.

PCT International Search Report for PCT/IB 03/01682, Aug. 25, 2003.

* cited by examiner

METHOD AND APPARATUS FOR APPROVING COLOR SAMPLES

CROSS REFERENCE TO RELATED APPLICATION

This application is a divisional application of co-pending U.S. Ser. No. 10/195,251, filed Jul. 15, 2002, the entire disclosure of which is hereby incorporated herein by reference, which claims the benefit of U.S. Provisional Application No. 60/376,007 filed Apr. 26, 2002. Furthermore, U.S. Pat. No. 7,184,170, entitled METHOD AND APPARATUS FOR COLOR MANAGEMENT, the entire disclosure of which is hereby incorporated herein by reference.

BACKGROUND OF THE INVENTION

Color management is extremely important to many retail industries where sales are often related to the ability of a retailer to offer products in colors that are currently popular. Taking the textile/apparel industry as an example, the popularity of certain colors waxes and wanes seasonally, requiring the retailer to be ever vigilant regarding the color of the products offered for sale. Manufacturers, distributors, designers and retailers (simply termed retailer hereinafter), are continually seeking methods and apparatus to ensure consistency of color in the products that they offer for sale. This starts with the colorants, including pigments and dyes, that are used to color, e.g. dye, the material used in their products. Many retailers are faced with the further task of ensuring color-coordination of products on different materials, such as different fabrics, ceramics, plastics, etc. Compounding the difficulties of such a task, materials from different vendors have a tendency to behave differently as viewing conditions change, such as, natural daylight versus artificial lighting, or viewing angle. Given that a fairly typical retailer in, for example, the textile/apparel industry, may purchase the same textile/apparel products from ten different vendors in six different countries on three different continents, the time and resources spent on color management becomes significant.

Continuing with our example the textile industry, when purchasing textile products for resale, a retailer creates a specification that may include: a pattern; a fabric; a color name; and reflectance data associated with the desired color and fabric. The specification is provided to multiple vendors. These vendors in turn may sub-contract out some of the materials and or dying process. For example, a dye house may be asked to match the color of the fabric requested by the retailer and dye the fabric for subsequent assembly of the textile product. To do this, the dye house may use internal resources or consult external resources, such as a colorant manufacturer. Often, the match is not perfect, but instead is an approximation with colorants available to the professional performing the match. Recognizing this, most retailers require that a sample produced using the color match be sent to the retailer for approval of the color match. A color-matching professional associated with the retailer will review the sample and report the results back to the vendor. Experience has shown that for every sample approved, six are rejected.

A modern color office has a couple of automated tools at its disposal to assist with the reviewing process. Upon reception of the color sample, a spectrophotometer can be used to obtain reflectance data that can be compared, either manually or automatically, to reflectance data for an approved sample. A light box that simulates several different light sources can aid in determining if the sample has unacceptable metamerism. A word processor can be used to generate an acceptance or rejection letter. More verbose rejection letters include comments from the reviewer that attempt to provide guidance for future submissions, perhaps even including a suggested color recipe. Finally, the letter can be sent using e-mail or a facsimile machine.

Color selection is a time consuming process that has heretofore required a highly experienced color matching professional to ensure consistency across several product lines. A color matching professional may be called on to review a hundred or more submissions per day. In the past, this has required hours of effort analyzing each submission, identifying deficiencies and preparing detailed reports in an effort to avoid further failed attempts. With a trend toward color coordination in almost every consumer product, the amount of time and resources being devoted to selecting colors is becoming significant and is outpacing the availability of color matching professionals.

For example, consider the automotive industry. It is not uncommon for an automaker to coordinate matching colors in the interior of an automobile. This requires matching color across a variety of materials, including: plastic, leather, metal, and fabric. Given that each type of material requires separate approvals (each with a 6-to-1 rejection ratio), such matching has, in the past, required an extraordinary amount of effort from color-matching professionals.

Another example is the athletic shoe industry. The current style in sneakers includes a mix of a variety of different materials, each of which must be dyed so as to match the other materials. It is possible that any given sneaker will contain several, if not all, of the following materials: cotton, polyester, nylon, leather, rubber, metal and plastic. Each material needs to be individually color matched. Further, it is not uncommon for other types of products, such as clothing; bags; and watches, to be promotionally tied with a sneaker line, presenting additional materials that require dyeing to a predetermined color.

Co-pending U.S. patent application Ser. No. 09/883,647, entitled: A PROCESS FOR COLOR MANAGEMENT, incorporated herein by reference, describes the use of an engineered color standard (ECS) by a retailer for controlling a color quality across multiple suppliers. Co-pending U.S. patent application Ser. No. 10/109,122, entitled METHOD AND APPARATUS FOR COLOR MANAGEMENT, incorporated herein by reference, describes apparatus and methods for generating color recipes. However, the apparatus and methods described in these applications do not provide tools that directly assist the color matching professional with reviewing the hundreds of submissions on a daily basis. The present invention provides improved methods and apparatus that automate much of the color sample review process.

SUMMARY OF THE INVENTION

The present invention is directed to software, an on-line information system and methods of doing business that links the manufacturers and vendors of colored materials (textiles, leather, plastics etc.) with the seller/retailer through a digital hub to enable exchange of color information. According to one aspect, the present invention comprises software accessible from a user's desktop and a centrally accessible data storage facility, such as a web folder for sharing information regarding color approval, between a vendor and a retailer.

Color information for color standards are made available to all the system users through a web folder. Providing a web folder through which color information can be retrieved ensures that the manufacturers have immediate access to up to date information. Color samples are measured by remote users (manufacturers or vendors) on a spectrophotometer, or other color analysis apparatus, and the color data is transmitted to the web folder. The manufacturer/vendor also fills out an onscreen form for the color sample and transmits that along with the color data. This color data and the information from the onscreen form constitutes a color or electronic submit (referred to herein as an electronic color submission) that can be reviewed on-line by the color analyst at the retailers office, or any other location wherein access to the system is available. The color analyst can then determine, using the data present in the electronic submit, whether to accept or reject the color sample of the manufacturer/vendor.

Preferably, the electronic color submission is used instead of a physical submit sent by mail, thereby significantly reducing the time necessary to reject or accept a color sample generated by the manufacturer/vendor. In an alternative embodiment, the software enables the manufacturer/vendor to print the information contained in the electronic color submission onto a submit form, attach samples and send a physical submit in addition to the electronic submit. In certain circumstances, physical submits are needed for samples that are difficult to measure accurately.

The system is designed to provide a unified on-line method for handling physical and electronic color submissions, which significantly reduces the time necessary to reject or accept a color sample from a manufacturer/vendor, and the costs associated therewith.

In accordance with the present invention, the color analyst can view a plurality of electronic color submissions that have been received on the web folder from one or more manufacturers/vendors. The color for the standard and the sample submitted are represented onscreen, as they would appear in three different types of ruminants. The numeric values and plots of the color difference and its components (lightness, chroma, hue) are also shown. The software allows quick comparison of the submitted sample with previous submits for the same color from the same or a different vendor. The analyst can make an assessment based on this information and approve or reject the sample along with comments. The color analyst's response, i.e. rejection or acceptance, is preferably sent by email to the submitter.

The email system is integrated with the client software to automate and accelerate the process of sending out these responses. The software allows the addition of standardized comments about the color analysis to the email. Color plots and on-screen color representations are also included in the response. Colorant recipes that can achieve the target color can also be included if necessary.

The software keeps a log of the electronic color submissions received and the responses sent. This information can be transferred to a database and the information analyzed to identify problem areas.

Additionally, the present invention includes a method for color management by a retailer comprising the steps of: choosing an engineered color standard (ECS); communicating the ECS to a textile vendor; having a textile produced using the ECS; and controlling the textile's color quality by comparing the ECS to the produced textile. The ECS preferably comprises reflectance data and a dye specification.

BRIEF DESCRIPTION OF THE DRAWINGS

An understanding of the present invention can be gained from the following detailed description of the invention, taken in conjunction with the accompanying drawings of which.

DETAILED DESCRIPTION

Figure 1:
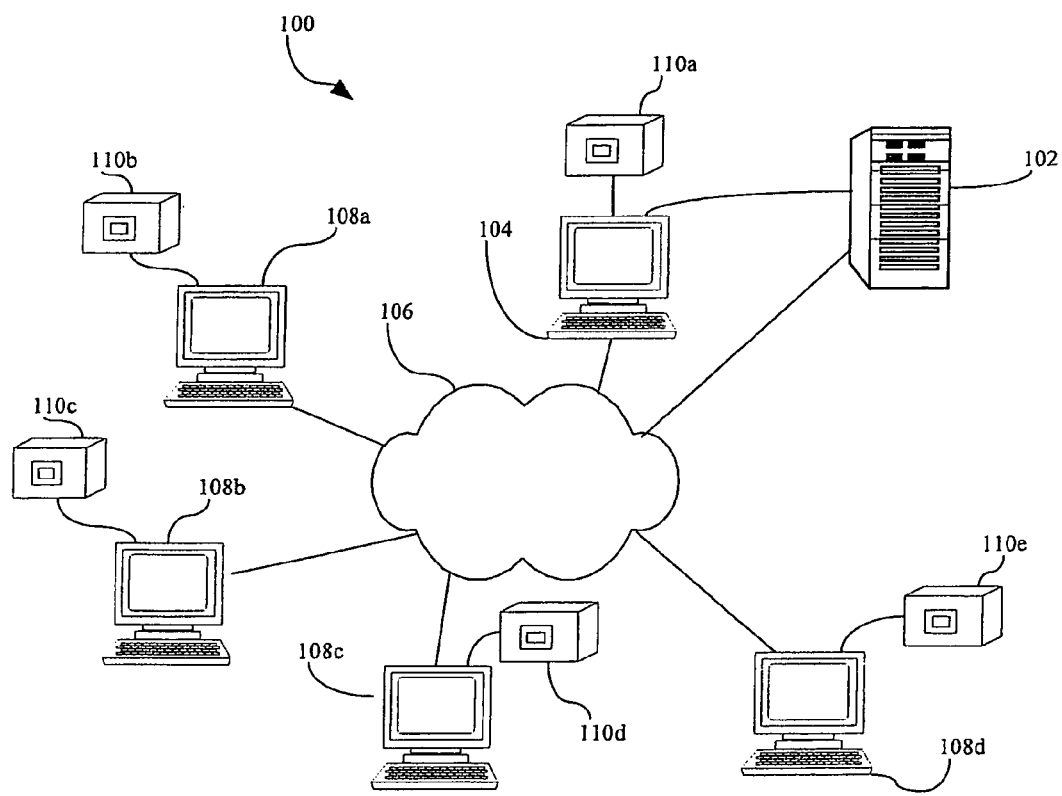
FIG. 1 is a block diagram of an apparatus for approving color samples in accordance with a preferred embodiment of the present invention.

Reference will now be made in detail to the present invention, examples of which are illustrated in the accompanying drawings, wherein like reference numerals refer to like elements throughout.

The detailed description that follows presents methods that may be embodied wholly or partially by routines and symbolic representations of operations of data bits within a computer readable medium, associated processors, networks, and network devices. A method is here, and generally, conceived to be a sequence of steps or actions leading to a desired result, and as such, encompasses such terms of art as "program," "objects," "functions," "routines," "subroutines," and "procedures." These descriptions and representations are the means used by those skilled in the art effectively convey the substance of their work to others skilled in the art.

In general, many of the steps in the present method require physical manipulation of data representing physical quantities. Usually, though not necessarily, these quantities take the form of electrical or magnetic signals capable of being stored, transferred, combined, compared or otherwise manipulated. Those of ordinary skill in the art conveniently refer to these signals as "bits", "values", "elements", "symbols", "characters", "images", "terms", "numbers", or the like. It should be recognized that these and similar terms are to be associated with the appropriate physical quantities and are merely convenient labels applied to these quantities.

Some of the apparatus set forth in the present application may be specifically constructed for the required purpose, i.e. color matching, but the methods recited herein may operate on a general purpose computer or other network device selectively activated or reconfigured by a routine stored in the computer and interface with the necessary colorسensing equipment. More to the point, the methods presented herein are not inherently related to any particular computer system. In particular, various machines may be used with routines in accordance with the teachings herein. On the other hand, it may prove more convenient to construct more specialized apparatus to perform the required method steps. In certain circumstances, when it is desirable that a piece of hardware possesses certain characteristics, these characteristics are described more fully in the following text. Machines that may perform the functions of the present invention include those manufactured by such companies as HEWLETT PACKARD, DELL and DATACOLOR as well as other manufacturers of computer and color analysis equipment.

With respect to the software described herein, those of ordinary skill in the art will recognize that there exist a variety of platforms and languages for creating software for performing the procedures outlined herein. The preferred embodiment of the present invention can be implemented using MICROSOFT VISUAL BASIC, however, those of ordinary skill in the art also recognize that the choice of the exact platform and language is often dictated by the specifics of the actual system constructed, such that what may work for one type of system may not be efficient on another system. The preferred embodiments of the present invention can also be implemented using HTML (in association with JAVA, PEARL, CGI, etc. . . . ) for access with browsers such as INTERNET EXPLORER from MICROSOFT.

FIG. 1 is a block diagram of an apparatus 100 for approving color samples in accordance with a preferred embodiment of the present invention. The color approval system 100 provides automated methods that incorporate much of the expertise of a color matching professional. It will be appreciated by those of ordinary skill in the relevant arts that the color approval system 100, as illustrated in FIG. 1, and the operation thereof as described hereinafter is intended to be generally representative such systems and that any particular system may differ significantly from that shown in FIG. 1, particularly in the details of construction and operation of such system. As such, the color approval system 100 is to be regarded as illustrative and exemplary and not limiting as regards the invention described herein or the claims attached hereto.

The color approval system 100 includes a server 102 connected to a computing device 104 associated with the color office of a retailer. The server 102 can be any number of devices, such as a personal computer configured to act as a server or a dedicated server such as those marketed by SUN and COMPAQ. Preferably, the server 102 is an Internet server capable of acting as an FTP, http, PPP, and SMTP server. The computing device 104 may be any device capable of performing the functions described herein, and could comprise a personal computer, such as those marketed by DELL, a handheld computer, a PDA, or a dedicated ASIC device. Each vendor that wishes to submit samples for approval to the retailer is provided with a computing device 108. FIG. 1 portrays four vendor computing devices 108a through 108d. However, those of ordinary skill in the art will recognize that the number of vendors dictates the number of computing devices 108.

The retailer's computing device 104 is preferably capable of receiving data from a remote storage device, such as the server 102. The retailer's computing device 104 and the server 102 are preferably connected via a network 106 that is accessible by the vendor's computing devices 108a through 108d. In perhaps the preferred embodiment, the network 106 is the Internet. However, the present invention may be practiced on any number of networks, both private and public. The computing device 104 may also be directly connected to the server 102 or through a LAN.

In operation the server 102 provides a central data store accessible by the retailer and each of the vendors. Vendors upload electronic color submissions for approval by the retailer. The retailer downloads the electronic color submissions, reviews each submission and uploads approvals and rejections for subsequent retrieval by the vendors. In perhaps the simplest embodiment, the server simply provides FTP service to the retailer and vendors.

Spectrophotometers 110a though 110e, such as a DATA-COLOR SPECTRAFLASH or a GRETAG/MACBETH COLOREYE, are preferably connected to the computing devices 104 and 108n. Spectrophotometers 110n analyze the color of a samples and outputs reflectance values. Any device or combination capable of providing standard reflectance data may be used instead of the spectrophotometer 110a. The spectrophotometer 110a is used by the retailer to analyze physical color samples, for example from those vendors that are not connected to the network 106. Vendors use the spectrophotometers 110b through 110e to prepare electronic color submissions. In accordance with one preferred embodiment, as described herein after, the vendor spectrophotometers 110b through 110e are calibrated with respect to the retailer's spectrophotometer 110a.

Figure 2:
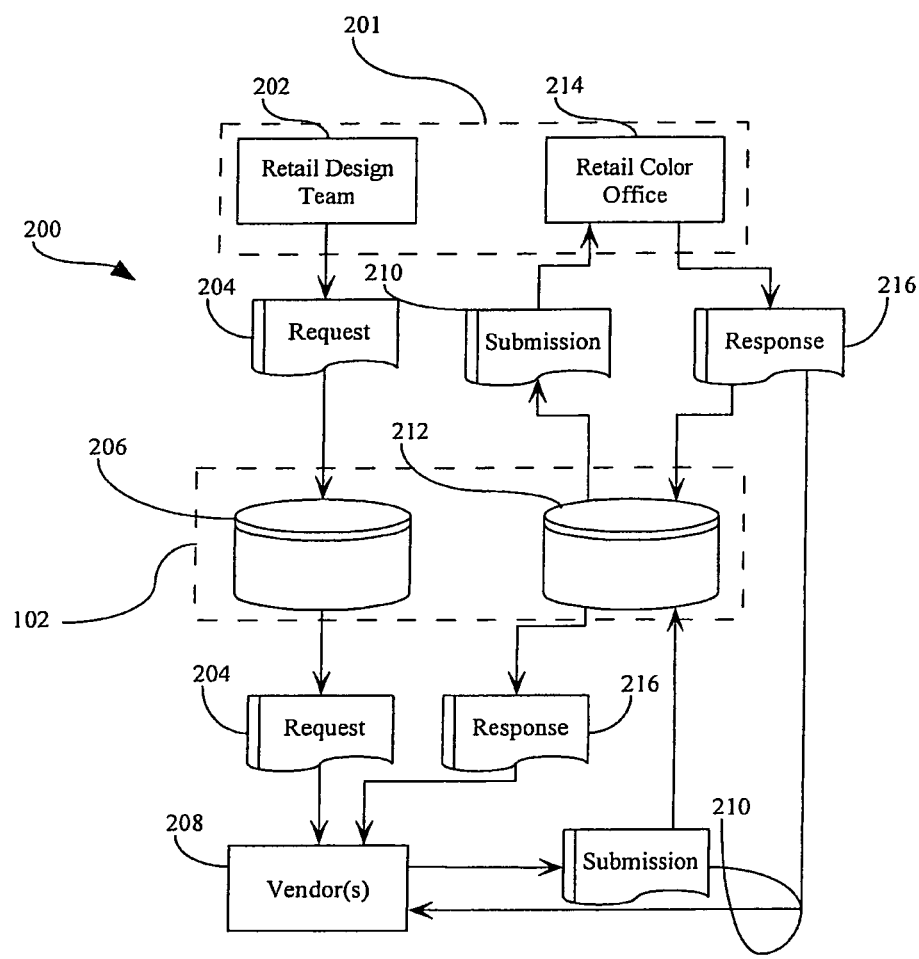
FIG. 2 is a workflow diagram of a color approval system in accordance with the preferred embodiment of the present invention.

FIG. 2 is a workflow diagram of a color approval system 200 in accordance with the preferred embodiment of the present invention. A retailer 201 has a retail design team 202 prepare an electronic request for samples 204 (request(s) 204). The requests 204 are uploaded to a storage location 206 on the server 102. The storage location 206 may be, for example, a directory available via FTP, a web folder, or possible a FTP directory mapped as a network drive using such software as WEBDRIVE. The requests 204 preferably provide identification information and an indication of the required color. The indication of the required color can be created using, for example the ECS described in co-pending application Ser. No. 09/883,647. Alternatively, a sample of the desired color can be scanned with the spectrophotometer 110a and reflectance values provided. Of course, in many instances the indication can simply comprise a reference to a color standard, such as PANTONE. Vendors 208 retrieve the requests 204 from the storage location 206 and prepare samples for submission to the retailer's color office 214.

The dye recipe for these samples may be prepared using the apparatus and methods described in co-pending application Ser. No. 10/109,122. Hopefully, the vendor 208 will have an internal review process to determine if the sample is acceptable. In one preferred embodiment, vendors 208 are provided with the same software as the retailer 201 thereby permitting a similar analysis as that which will be performed by the retailer 201. In any event, the vendor 208 prepares an electronic color submission 210 (submission(s) 210), as described hereinafter, and uploads the submissions 210 to a storage location 212, for retrieval by a color office 214 associated with the retailer. The storage location 212 may be, for example, a directory available via FTP, a web folder, or possible a FTP directory mapped as a network drive using such software as WEBDRIVE. The storage location 212 can be logically and/or physically located on the server 102 or anywhere convenient. In general, the submission 210 comprises identifying information such as the vendor's name, an identification of the request to which the sample is responding, an identification of the fiber and fabric of the sample, submission number (first, second . . . ) and date sent. Additionally, the submission 210 comprises a set of reflectance values as measured by the spectrometer 110n associated with the vendor 208. Preferably, the color approval system 200 provides guidance in filing out the request and may even provide an initial opinion of the color sample based on reflectance values supplied with the request. In one preferred embodiment of the present invention, the vendor 208 supplements the submission 210 with a physical sample mailed to the retailer's color office 214.

The retailer's color office 214 retrieves the submissions 210 from the storage location 212 for analysis. The color approval system 200 provides software tools for analyzing the submission 210 including color-matching tools and simulated images of the sample. Several example of possible software tool will be discussed hereinafter Preferably, the color approval system 200 provides a calibration function based on data about the spectrometer 110n associated with the vendor 208. Once the analysis is complete the retailer's color office 214 prepares a response 216 that, as described hereinafter may contain either a rejection or an acceptance. The color office 214 transmits the response 216 to the vendor 208. Such transmission can take place in a variety of manners. As shown in FIG. 2, the response 216 can be placed on the server 102 or may be transmitted directly, such as through e-mail or fax to the vendor 208. If the response 216 is stored on the server 102, it may be placed in the storage location 212, as shown, the storage location 206 or even an entirely separate location.

The color approval system 200 preferably provides software for automating the creation of responses 216 including acceptances and rejections. Acceptances are very straightforward, but rejections may contain extra data. To further ease the burden on color-matching professional, the color approval system 200 can be provided with software that conducts an analysis of the submissions 210 and automatically prepares full or partial responses.

Figure 3:
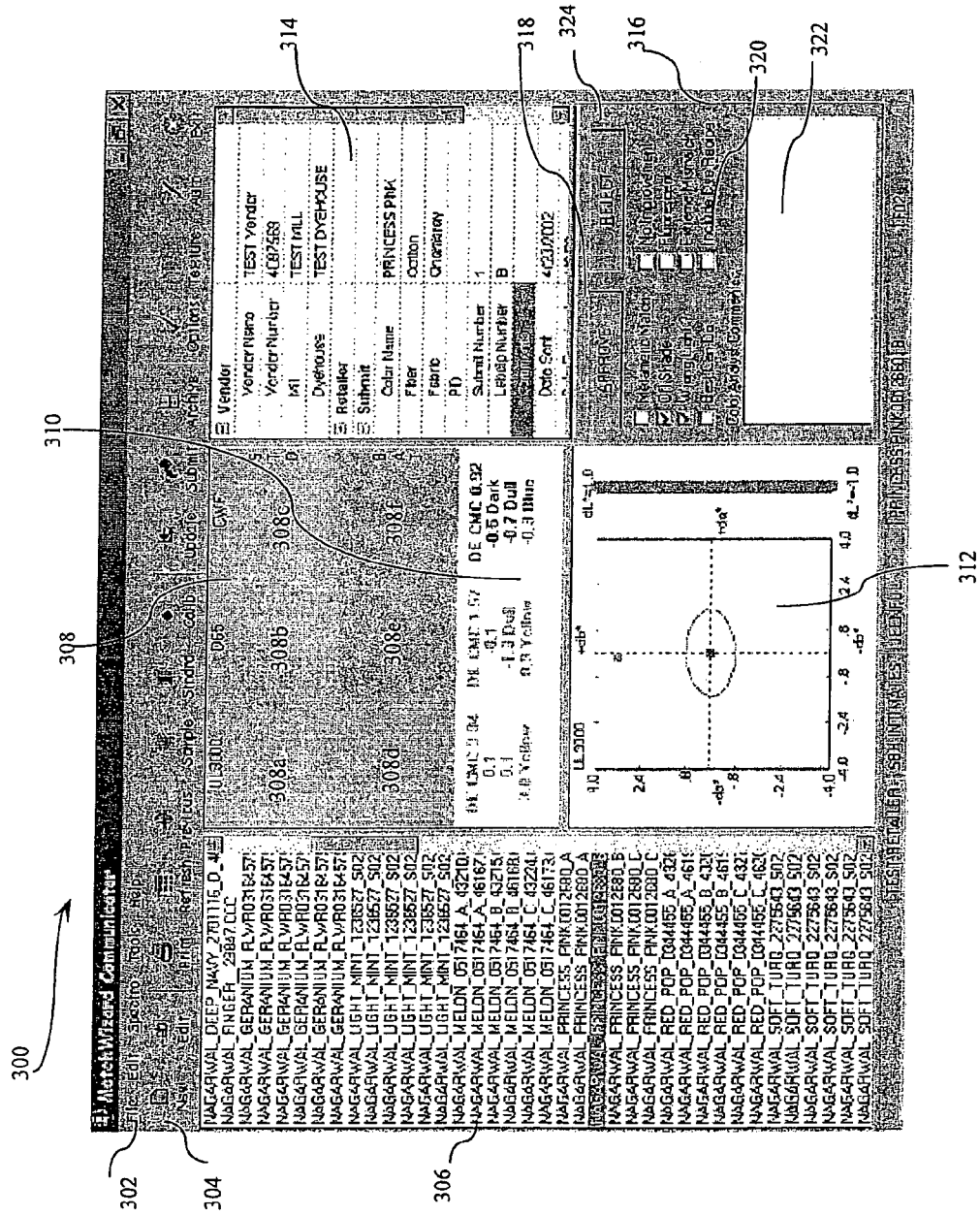
FIG. 3 is an illustration of a display produced by an apparatus for approving color samples in accordance with a preferred embodiment of the present invention.

FIG. 3 is an illustration of a display 300 produced by an apparatus for responding to electronic color submissions 210 in accordance with a preferred embodiment of the present invention. Those of ordinary skill in the art will recognize that the display 300 shown in FIG. 3 is but one of many forms that such a display could take. In particular, the display 300 is adapted for the many WINDOWS operating system distributed by MICROSOFT, including: WINDOWS 98, WINDOWS ME, WINDOWS 2000, and WINDOWS XP. The particular display shown in FIG. 3 is a sample of one that has been configured for use by a retailer. Due to the graphical nature of the WINDOW operating system, screen shots prove suitable reference for discussing the functions offered by the apparatus of the present invention.

The display 300 includes a standard menu bar 302 with pull down menus, to access a variety of functions provided by the color approval system, and a button bar 304 to provide one-click access to certain of those functions. The majority of the display is broken into several panes of information and user modifiable data fields. The list 306 displays names of the electronic color submissions residing in the server 102. The contents of the list 306 can preferably be filtered, using functions accessible from the menu bar 302 and button bar 304, to show only those electronic color submission that are current, rejected, approved, or archived. Functions may be provided to further filter the list based on, for example the request to which the samples are responding or to show al the electronic color submissions provided by a certain vendor. As is known in the art, functions, accessible from the menu bar 302 and button bar 304, may be provided to sort the list 306 by, for example name or date.

A sample pane 308 provides an indication of the color of a sample associated with a selected electronic color submission. The actual color displayed is determined by the reflectance values contained in the electronic color submission. Preferably, as shown in FIG. 3, the sample pane 308 provides a representation of the desired color, with which to compare the sample color. The representation may be based, for example on a scan of an approved sample or calibration data previously stored in the server 102 (see FIG. 1) To provide further help, as also shown in FIG. 3, the sample pane also provides displays of the sample and desired color under different light sources. Any of a number of known algorithms may be used to create and display the representations of the desired color and the sample color.

Looking at the sample pane 308 in FIG. 3, we see a first representation of the desired color 308a (princess pink in this case) under a UL3000 light source (Ultralume 3000 a typical light source utilized in retail stores), a second representation of the desired color 308b under a D65 light source (a source containing little energy in the longer wavelengths), and a third representation of the desired color 308c under a CWF light source (cool white fluorescent). Representation of the sample color 308d, 308e, and 308e, based on reflectance data contained in the electronic color submission, are displayed directly below the representations of the desired colors.

In a further enhancement of the sample pane 308, the desired colors 308a-c and sample colors 308d-f may be textured to simulate the fabric upon which the sample was created. Once again any of a number of known algorithms may be used to provide such texture.

Display panes 310 and 312 provide textual and graphic color correlations information to assist with color approval. Specifically, display pane 310 provides color reflectance difference values of the samples while the display pane 312 provides a standard AB plot (also known as a CIE a*-b* plot). Ellipse 312a shows an acceptable deviance plot. Any point inside of the ellipse 312a is probably an acceptable match, while points plotted outside of the ellipse 312a are typically unacceptable. The size of the ellipse 312a is preferably definable by the user through functions accessible from the menu bar 302 and/or the button bar 304.

The data pane 314 provides identification and other data associated with the electronic color sample, including an identification of the vendor, retailer, and pertinent data about the submission.

The reply pane 316 assists the retailer with the formation of a reply to the submission. If the reply is to be an acceptance, the retailer must only press the APPROVE Button 318 that activates a function to send a pre-formatted acceptance letter to the e-mail associated with the submission. Using the MICROSOFT WINDOWS systems, such integration with an e-mail program such as LOTUS NOTES or MICROSOFT OUTLOOK is well within the skill of those of ordinary skill in the art.

Should the retailer wish to reject the electronic color submission, checkboxes 320 are provided that list the most used rejection criteria. Preferably, the list of most used criteria is user customizable. To include predetermined comments directed toward these criteria, the retailer need only check the appropriate box. In addition to the inclusion of the predetermined comments, the text inserted into the resultant response can also be variable based on the reflectance values associated with the submission. In a simple form, the checking of a box, such as "Metameric Match" would cause the insertion of a fixed text string indicating a problem with metamerism and a variable text string containing, for example, the difference values shown in pane 310. Additionally, there is a check box that allows the inclusion of a suggested dye recipe, preferably generated with a: system in accordance with co-pending U.S. patent application Ser. No. 10/109,122, entitled METHOD AND APPARATUS FOR COLOR MANAGEMENT.

Finally, a text entry field 322 is provided to capture comments from the retailer that fall outside those provided by the check boxes 320. Upon completion of the data entry for a rejection the retailer merely presses the REJECT button 324 to create a rejection message and either immediately send the rejection message or, preferably, show the proposed rejection message for approval by the retailer (see FIG. 5 and the associated discussion hereinafter). Rather than immediate transmission, the responses may be queued for further review with all approved responses being sent out in a batch process.

Figure 4:
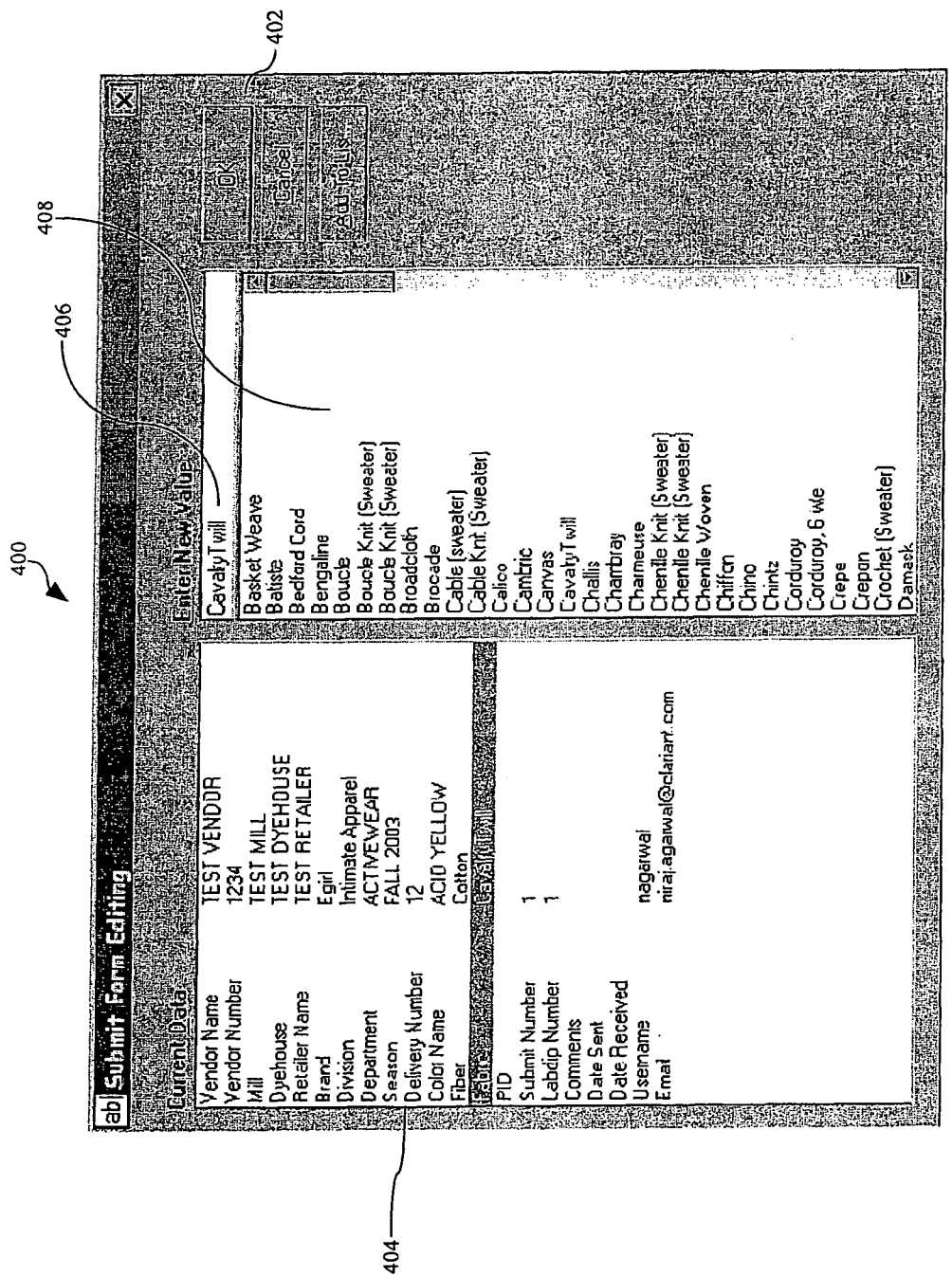
FIG. 4 is an illustration of another display produced by an apparatus for approving color samples in accordance with a preferred embodiment of the present invention.

FIG. 4 is an illustration of another display 400 produced by an apparatus for approving color samples in accordance with a preferred embodiment of the present invention. Those of ordinary skill in the art will recognize that the display 400 shown in FIG. 4 is but one form among many that such a display could take. In particular, the display 400 is adapted for the many WINDOWS operating system distributed by MICROSOFT, including: WINDOWS 98, WINDOWS ME, WINDOWS 2000, and WINDOWS XP. The particular display shown in FIG. 4 is a sample of one that has been designed for use by a vendor. In one preferred embodiment of the present invention, the software for both the vendor and the retailer are integrated into a single package. However, those of ordinary skill in the art will recognize that separate packages can be prepared for the vendor and the retailer.

The display 400 is a window that can be accessed from either the menu bar 302 or a button on the button bar 304 of the display 300 in FIG. 3. In this particular example, the vendor would first create a new file, using a function activated by either the menu bar 302 or a button on the button bar 304. The vendor would then activate a scanning function, that scans the sample being submitted, using either the menu bar 302 or a button on the button bar 304. The vendor can then preview and edit the submission form using the display 400 activated from either the menu bar 302 or a button on the button bar 304. In the example shown in FIG. 4, the vendor has selected to edit the "fabric" field in the current data pane 404. A new value for the field may either be selected from the list 408 or typed in the text entry field 406. The values in the list 408 change, as is known to those of ordinary skill in the art, based upon the field in the current data pane 404 that has been selected. Once the vendor is satisfied with the submission, he merely presses the Ok button 402 to send the submission to the retailer or, more preferably, to place the submission into a queue for subsequent sending. If a queue is used, the retailer can request that all submissions in the queue be sent at once by activating a button on the button bar 304 or selecting an entry from the menu bar 302.

Figure 5:
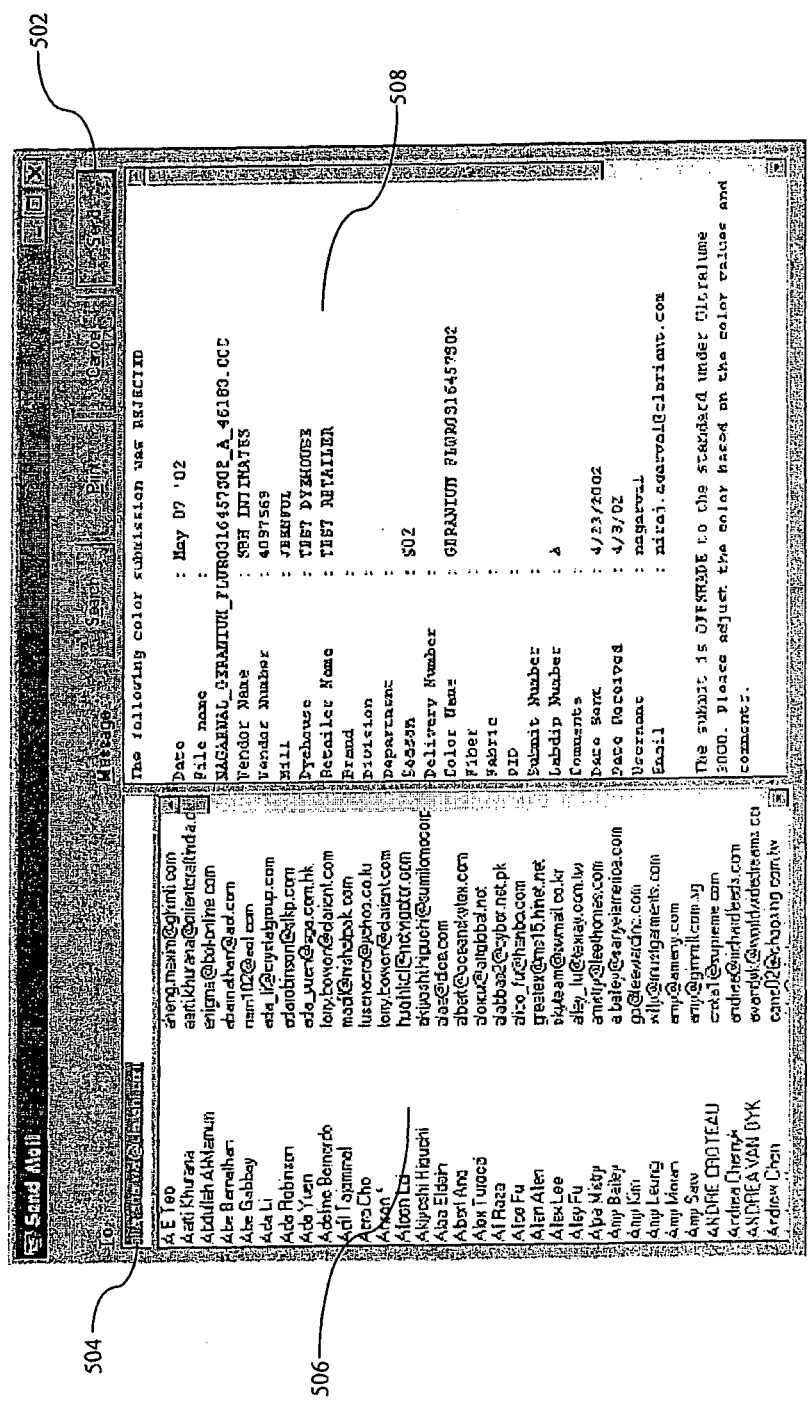
FIG. 5 is an illustration of another display 500 produced by an apparatus for approving color samples in accordance with a preferred embodiment of the present invention.

FIG. 5 is an illustration of another display 500 produced by an apparatus for approving color samples in accordance with a preferred embodiment of the present invention. Those of ordinary skill in the art will recognize that the display 500 shown in FIG. 5 is but one form among many that such a display could take. In particular, the display 500 is adapted for the many WINDOWS operating system distributed by MICROSOFT, including: WINDOWS 98, WINDOWS ME, WINDOWS 2000, and WINDOWS XP. The particular display shown in FIG. 5 is a sample of one that has been designed for use by a retailer to review a response prior to sending. Accordingly, the display shown in FIG. 5 is activated after the user presses the APPROVE or REJECT buttons, 318 and 324.

In the example shown in FIG. 5, the retailer is able to specify e-mail recipients 504 either manually or by selecting a recipient from the list 506. The button bar 502 allows the retailer to "Send" the message or "Cancel" the message. The retailer is also provided with the option to "print" the message.

Table 1 shows an example of an acceptance message produced by a system in accordance with the preferred embodiment of the present invention.

TABLE 1

GERANIUM FLWR0316457S02-B APPROVED

Wednesday, May 08, 2002 04:21 PM
To: unknown@unknown.com
The following color submission was APPROVED
Date: May 08 '02

TABLE 1-continued

GERANIUM FLWR0316457S02-B APPROVED

File name: GERANIUM_FLWR0316457S02_B_52829.CCC
Vendor Name: RETAILER
Vendor Number: 4097569
Mill: JEENFUL
Dyehouse:
Retailer Name:
Brand:
Division:
Department: 22
Season: S02
Delivery Number:
Color Name: GERANIUM FLWR0316457S02
Fiber: KNIT JERSEY 100C
Fabric:
PID:
Submit Number:
Labdip Number: B
Comments:
Date Sent: Apr. 29, 2002
Date Received: Apr. 3, 2002
Username: nagarwal
Email: alsounknown@unknown.comnagarwal Table 2 shows an example of a rejection message produced by a system in accordance with the preferred embodiment of the present invention.

TABLE 2

YELLOW RAY-B REJECTED

Wednesday, May 08, 2002 04:20 PM
To: unknown@unknown.com
The following color submission was REJECTED
Date: May 08 '02
File name: YELLOW_RAY_0918959_S02_B_48713.CCC
Vendor Name: RETAILER
Vendor Number: 4097569
Mill: JEENFUL
Dyehouse:
Retailer Name:
Brand:
Division:
Department: 22
Season: S02
Delivery Number:
Color Name: YELLOW RAY
Fiber: KNIT JERSEY 100C
Fabric:
PID:
Submit Number:
Labdip Number: B
Comments:
Date Sent: Apr. 29, 2002
Date Received: Apr. 3, 2002
Username: nagarwal
Email: unknown@unknown.com
The submit is OFFSHADE to the standard under Ultralume 3000. Please adjust the color based on the color values and comments.
This submit shows NO IMPROVEMENT over the previous submit that was rejected!
Color Difference Report
UL3000: DE CMC 1.31 (−0.2 Dark, 1.3 Bright, 0.2 Green)D65: DE CMC 1.22 (−0.3 Dark, 1.2 Bright, −0.1 Red)CWF: DE CMC 1.20 (−0.3 Dark, 1.2 Bright, 0.0 Red)
SUGGESTED RECIPES FOR YELLOW RAY
COTTON RECIPE 0.112% Drimarene Yellow X8GN
0.199% Drimarene Yellow XRN
0.00435% Drimarene Blue XBLN
0.12 DE in Daylight D65
0.08 DE in Cool White

TABLE 2-continued

YELLOW RAY-B REJECTED

NYLON RECIPE 0.0578% Nylosan Yellow E4G 200
0.0152% Nylosan Yellow E2RL
0.00115% Nylosan Blue E2GL 200
0.91 DE in Daylight D65
0.46 DE in Cool White

POLYESTER RECIPE 0.316% Foron Yellow SEFL
0.00288% Foron Brilliant Orange ERL 200

TABLE 2-continued

YELLOW RAY-B REJECTED 0.00217% Foron Turquoise SBLN 200
0.34 DE in Daylight D65
0.09 DE in Cool White
nagarwal Table 3 shows another example of a rejection message produced by a system in accordance with the preferred embodiment of the present invention.

TABLE 3

Acid Yellow-1 REJECTED

Thursday, May 09, 2002 09:19 AM
To: unknown@unknown.com
The following color submission was REJECTED
Date: May 09 '02
File name: YELLOW_1_33263.CCC
Vendor Name: RETAILER
Vendor Number: 1234
Mill: TEST MILL
Dyehouse: TEST DYEHOUSE
Retailer Name: TEST RETAILER
Brand:
Division:
Department:
Season: FALL 2003
Delivery Number:
Color Name: Acid Yellow
Fiber:
Fabric:
PID:
Submit Number:
Labdip Number: 1
Comments:
Date Sent: May 9, 2002
Date Received:
Username: nagarwal
Email: dontknow@dontcare.com
This submit is METAMERIC to the color standard. The color difference in D65 is
too high. Please re-match using a different dye formulation to correct the metamerism.
The submit is OFFSHADE to the standard under Ultralume 3000. Please adjust the
color based on the color values and comments.
The submit was matched in the WRONG LIGHT. Please inform the mill that the primary
light source is Ultralume 3000 and the secondary light source for matching is
D65.
This submit shows NO IMPROVEMENT over the previous submit that was rejected!
This submit is FLUORESCENT making color difference number unreliable. Please make
visual corrections based on the comments.
This submit is an EXTREME MISMATCH to the color standard. Please check to see
if the mill has the right color standard and are matching under the correct lights.
Color Difference Report
UL3000: DE CMC 2.89 (1.2 Light, 2.1 Bright, −1.6 Red)D65: DE CMC 3.13 (1.1 Light,
1.6 Bright, −2.5 Red)CWF: DE CMC 2.76 (1.2 Light, 2.0 Bright, −1.5 Red)
SUGGESTED RECIPES FOR ACID YELLOW ECS
COTTON RECIPE 0.967% Drimarene Yellow CL3G
0.138% Drimarene Yellow CL2R
0.0125% Drimarene Blue CL2RL
0.26 DE in Daylight D65
0.1 DE in Cool White
NYLON RECIPE 0.45% Nylosan Yellow N7GL
0.0543% Nylosan Yellow N3RL
0.00964% Nylosan Green NGL
0.33 DE in Daylight D65
0.12 DE in Cool White
POLYESTER RECIPE 0.106% Foron Brilliant Yellow S6GL
0.0268% Foron Brilliant Orange SFL
0.00306% Foron Blue SE2RN TABLE 3-continued Acid Yellow-1 REJECTED 0.65 DE in Daylight D65
0.42 DE in Cool White
nagarwal In accordance with one preferred embodiment of the present invention, acceptance and rejection messages also include representations of the AB chart shown in pane 312 of FIG. 3.

Figure 6:
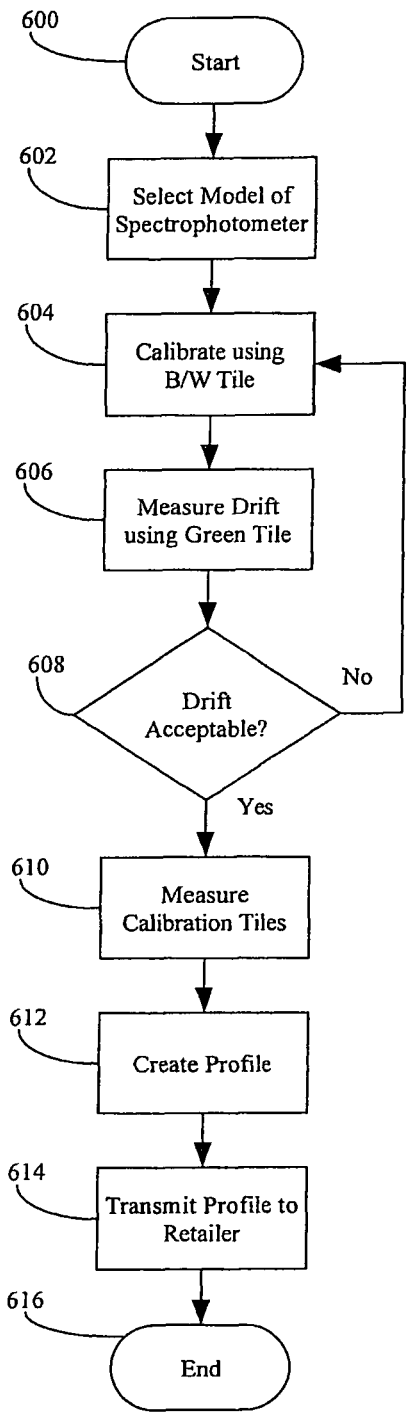
FIG. 6 is a flowchart of a method for certifying a spectrophotometer in accordance with a preferred embodiment of the present invention.

FIG. 6 is a flowchart of a method for certifying a spectrophotometer in accordance with a preferred embodiment of the present invention. The foregoing color approval system is somewhat predicated on the trust that a retailer places in the spectrophotometer employed by the vendor to produce the reflectance values used in the submission. It is within the scope of the present invention to provide apparatus and methods for approval and calibration of the vendor's spectrophotometer. Such methods are preferably integrated with the display 300 shown in FIG. 3. The functions described herein below with respect to the method may be activated using the menu bar 302 and/or button bar 304.

Prior to certifying any spectrophotometer, one spectrophotometer, typically retailer's spectrophotometer 110*a* in FIG. 1, is used to establish the "standard" reflectance data. Such a spectrophotometer is termed the "master instrument." A set of calibration tiles is measured on the master instrument to create a data file with the tile measurements. Preferably, the present method is implemented with a set of calibration tiles that has at least twelve different tiles. Such calibration tiles are readily available from a variety of sources including the British Ceramic Research Institution (BCRI). The data file may be uploaded to the web to permit each spectrophotometer 110*n* access.

The method starts in step 600. In step 602, the vendor selects a model of spectrophotometer that is attached to his computing device. The retailer can suggest or demand that the vendor only use certain preferred brands and models that have a history of producing acceptable results. Next in step 604, the vendor performs the calibration functions associated with his particular model. Most spectrophotometers calibrate using black and white tiles. Next in step 606, the vendor measures the drift of his spectrophotometer, (typically using a green tile). In step 608 a check is made to determine if the drift is acceptable. If the drift is not acceptable, the method returns to step 604 for additional calibration.

If the drift is acceptable in step 608, the method goes to step 610 and calibration tiles are measured. These may be the same calibration tiles used to create the data file with the master instrument or may be a similar set from the same provider of tiles. Once the vendor has measured the calibration tiles, a profile is prepared in step 612. The profile is a collection of correction factors that can be applied to the output of the spectrophotometer being certified that transform the output to simulate the output of the retailer's spectrophotometer. A variety of known algorithms exist to create the correction factors. In general, the retailer's measurements are compared with the measurements on the master instrument to determine color differences between the readings on the two instruments. A regression model may be developed to better correlate the two instruments. For example, a linear model with an offset and a weight may be applied at each wavelength. The parameters from such a model become the "profile" of the instrument and may be saved locally or sent to the sever 102 in FIG. 1 for access by the retailer.

In the example shown in FIG. 6, the profile is transmitted to the retailer in step 614 for use when analyzing any submission from that particular vendor. However, the data may be stored on locally on the vendor's computer or in the server 102. In this case, the profile will be used to modify the reflectance data of future submissions prior to transmitting the electronic color submission. The method ends in step 616.

Although a few embodiments of the present invention have been shown and described, it will be appreciated by those skilled in the art that changes may be made in these embodiments without departing from the principles and spirit of the invention, the scope of which is defined in the claims and their equivalents.

For example, the color approval system can be modified to automatically perform some of the analysis and preparation of acceptance and rejection letters. One simple method is to threshold the difference values or the AB plot values. Those that display an extremely close match can automatically receive acceptance letters while those with extremely far off matches can receive rejections letters, with a canned "Extreme Mismatch" message. Electronic color submissions that cannot be classified as approved or rejected can be queued for manual review using the tools provided by the present invention. These letters could be queued for review or automatically sent at the discretion of the retailer.

Additionally, the system can be adapted for use in situations where either a vendor or the retailer lacks access to a suitable network. In such a case, the system could print out an electronic color submission or response in a predetermined format for manual processing.

By way of a further example, the system can be constructed in a modular way permitting the use of plug-in technology permitting users to substitute different analysis and reporting tools for those described herein.

The invention claimed is:

1. A method for approving or rejecting the color of an article, the method comprising the steps of:
developing or selecting an electronic color standard for the article;
developing color tolerances for the article;
storing the electronic color standard and color tolerances in a central database;
requesting an electronic color submission from at least one vendor;
receiving the electronic color submission from the at least one vendor;
analyzing the electronic color submission from the at least one vendor with software tools;
comparing the electronic color submission from the at least one vendor to the electronic color standard and the color tolerances stored in the central database by comparing one or more reflectance values for the electronic color submission from the at least one vendor with one or more reflectance values for the electronic color standard stored in the central database, identifying any differences between such values, displaying any differences between the reflectance values of the electronic color submission from the at least one vendor and the electronic color standard stored in the central database, comparing the electronic color submission from the at least one vendor with the electronic color standard stored in the central database by generating a CIE a*-b* plot for the electronic color submission from the at least one vendor and the electronic color standard stored in the central database, and identifying any deviances in such a plot, and displaying the CIE a*-b* plot of the electronic color submission from the at least one vendor and the electronic color standard stored in the central database, as well as any deviances in such a plot without the use of artificial intelligence;

determining an approval or rejection status of the electronic color submission from the at least one vendor based on the comparison of the electronic color submission to the electronic color standard and the color tolerances stored in the central database;

preparing a response to the electronic color submission from the at least one vendor;

recording the response to the electronic color submission from the at least one vendor in the central database; and electronically sending the response to the electronic color submission of the at least one vendor to the at least one vendor.

2. The method of claim 1, wherein the response to the electronic color submission from the at least one vendor further includes at least one recommendation for correcting the color of the article.

3. The method of claim 1, further comprising the step of developing the electronic color standard from a physical color standard.

4. The method of claim 1, wherein analyzing the electronic color submission from the at least one vendor comprises simulating the appearance of the electronic color submission under a plurality of lights.

5. The method of claim 1, wherein analyzing the electronic color submission from the at least one vendor comprises simulating the appearance of the electronic color submission on one or more textures.

6. The method of claim 1, wherein the step of comparing the electronic color submission from the at least one vendor with the electronic color standard stored in the central database further comprises the step of calculating a color difference for the electronic color submission from the at least one vendor and the electronic color standard stored in the central database with a color difference equation.

7. The method of claim 6, wherein the color difference equation is at least one of CIELAB DE and $DE_{cmc}$.

* * * * *